Jan. 25, 1927.
W. F. KRICHBAUM
PRESSURE REGULATOR
Filed Dec. 27, 1924
1,615,285
2 Sheets-Sheet 1
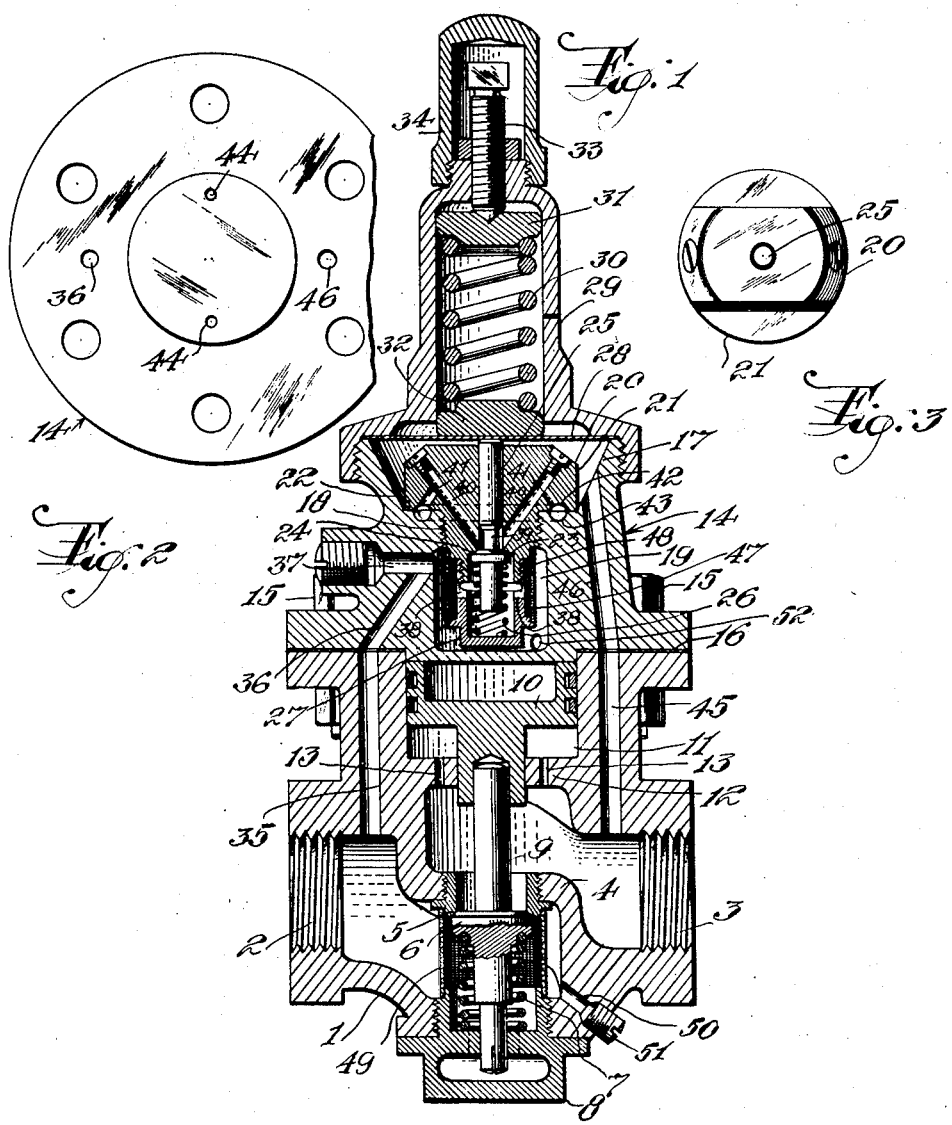
INVENTOR:
William F. Krichbaum,
BY
Everett Rook,
ATTORNEYS.

Jan. 25, 1927.
W. F. KRICHBAUM
PRESSURE REGULATOR
Filed Dec. 27, 1924
1,615,285
2 Sheets-Sheet 2
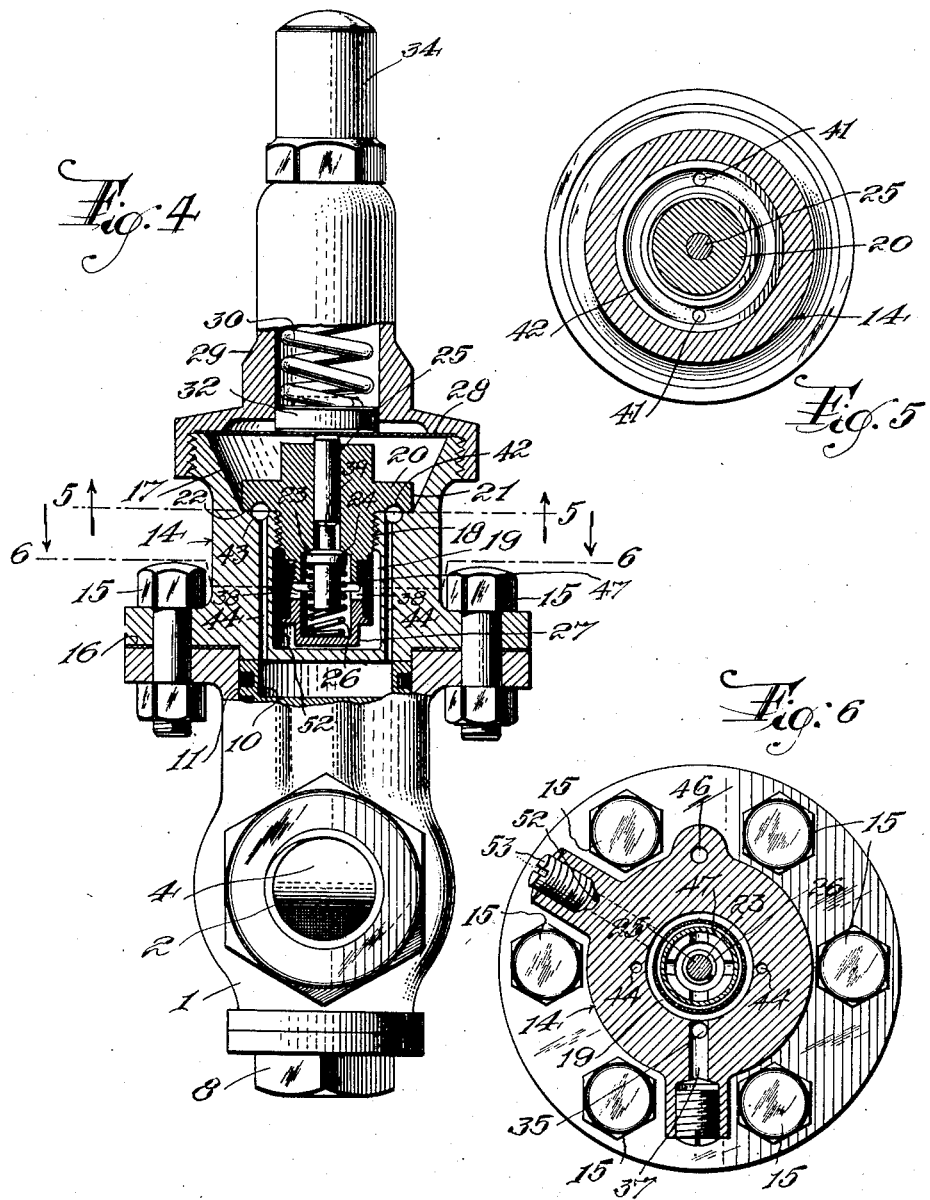
INVENTOR:
William F. Krichbaum,
BY
Everett Rook,
ATTORNEYS.

Patented Jan. 25, 1927.

1,615,285

UNITED STATES PATENT OFFICE.

WILLIAM F. KRICHBAUM, OF IRVINGTON, NEW JERSEY.

PRESSURE REGULATOR.

Application filed December 27, 1924. Serial No. 758,357.

The invention relates more especially to pressure regulators in which the initial or high pressure passes an auxiliary valve to act upon a piston or similar yielding medium to open the main valve, said auxiliary valve adapted to be actuated by the delivery pressure to keep said pressure constant at a predetermined point, as by said delivery pressure acting upon a diaphragm to balance the opposing pressure of a spring set to normally hold the auxiliary valve open to its fullest extent.

The objects of the invention are to secure an improved removable member carrying the auxiliary valve; to mount a removable auxiliary-valve member in a regulator independent of the chamber for the pressure-responsive means operating the main valve; to mount a removable auxiliary-valve member in another chamber than said chamber for the pressure-responsive means; to mount a removable auxiliary-valve member in a section of the regulator separate from the section having said chamber for the pressure-responsive means; to secure a removable auxiliary-valve member which is mounted in the pressure regulator so that it can be used for any one of a plurality of sizes of regulators; to thus reduce the number of repair parts necessary to be kept on hand; to conduct the high pressure through the auxiliary-valve member and afterward through the part of the regulator in which said member seats to the chamber for the pressure-responsive means; to so conduct the high pressure, upon passing the auxiliary-valve member, through the joint made by the said member seating against the said part of the regulator; to secure an auxiliary-valve member which shall seat upon a floor in a single continuous surface, preferably a plane; to screen the auxiliary-valve against the entry of dirt or the like, such as would interfere with proper action of the regulator; to enable the main valve of the regulator to be similarly screened, and to obtain other advantages and results as may be brought out by the following description.

Referring to the accompanying drawings, in which like numerals of reference designate the same parts throughout the several views, Figure 1 is a central vertical section through a pressure regulator embodying my invention, longitudinally of the direction of flow through the regulator;

Figure 2 is an underneath plan view of the auxiliary-valve section of the regulator;

Figure 3 is a plan of the auxiliary-valve member detached;

Figure 4 is an end elevation of the regulator, looking at its inlet end and partly in central vertical section transverse to the direction of flow through the regulator;

Figure 5 is a horizontal cross-section of the regulator on line 5—5, Fig. 4, looking in the direction indicated by the arrows, and Figure 6 is another horizontal cross-section on line 6—6, Fig. 4, looking in the opposite direction, as indicated by the arrows.

In the specific embodiment of the invention shown in said drawings, 1 indicates the main body portion of the regulator, provided with an inlet 2 and outlet 3 and having between said inlet and outlet a partition 4 provided with a seat 5 for the main valve 6, said main valve being normally closed by a spring 7 seated in a cap 8. Said main valve 6 has a stem 9 extending through the valve port and upon which stem is a piston 10 working in a piston chamber 11 formed in the upper part of the body portion 1, said stem being guided in a partition 12 which is perforated as at 13 to provide communication with the outlet side of the regulator. Any other pressure-responsive means which is common and well-known in the art can be employed instead of a piston, for moving the main valve, the piston being shown and described merely as an illustrative means.

Upon the said body portion 1 of the regulator is mounted an auxiliary portion shown as a bonnet 14 adapted to be bolted to the body section as by bolts 15, with a gasket 16 between the sections. This bonnet 14 is recessed from the top, as at 17, and provided at the center of the floor of said recess with a threaded opening 18 leading to an enlarged cavity 19 beneath, the whole providing a chamber to receive an auxiliary-valve member 20, which screws into the threaded opening 18 with its head 21 seating against the floor 22 around said threaded opening and its lower portion depending into the cavity 19.

The auxiliary-valve 23 is arranged centrally within its carrying member 20, closing against a downwardly facing seat 24 in the lower part of said member and having a stem 25 which extends upward through the carrying member 20 and projects from the top thereof. Said auxiliary-valve is normally held seated by a spring 26 mounted in a cap 27 which screws onto the lower end of the carrying member 20.

Above the auxiliary-valve member 20 is a flexible diaphragm 28 resting at its marginal portion upon the top edge of the bonnet 14 and adapted to engage at its center the auxiliary-valve stem 25. A spring chamber portion 29 screws upon the upper end of the bonnet, clamping the edges of the diaphragm 28, and in said spring chamber portion is a spring 30 with upper and lower followers 31, 32 by which through a screw 33 in the upper end of the spring chamber portion any desired yielding pressure is brought to bear upon the diaphragm 28 to hold the auxiliary-valve 23 open to its fullest extent until the delivery pressure counterbalances such predetermined pressure, a cap 34 covering said adjusting screw as is usual.

A duct 35 leads upward through the body portion 1 of the regulator, at its inlet side, and connects with ducts 36, 37 in the bonnet 14 which lead into the lower part or cavity 19 of the chamber thereof. The auxiliary-valve member cap 27 in said cavity 19 is transversely apertured, as at 38, 38, so that the initial or high pressure enters therethrough to pass the auxiliary valve 23. Beyond said valve its stem is reduced, as at 39, and from that part of the passage for said stem in the member 20 where the stem is reduced ducts 40, 40 diverge upwardly in the head of the member 20 and are provided with branch ducts 41, 41 opening through the under or seating face of said head into an annular groove 42 in said face; opposite said annular groove 42 is a similar groove 43 in the floor 22 upon which said head seats, and from this annular groove 43 ducts 44, 44 lead downward through the bonnet 14 to the piston chamber 11, see Figures 2, 4 and 5. The initial or high pressure is thus communicated to piston 10 to hold the main valve 6 open and permit flow therethrough. Preferably, both grooves 42 and 43 are employed, as shown, but under some conditions a single groove, in only one of the contacting parts, might be employed. In either event, they are at a distance or spaced from the threads by which the member screws into the opening 18, so that an annular portion of the seat intervenes to secure an impervious seal.

The delivery pressure passes upward through ducts 45, 46 in the body portion 1 and bonnet 14 to the chamber 17 beneath the diaphragm 28 and thus acts upon said diaphragm. Obviously when such delivery pressure equals the predetermined pressure on the other side of the diaphragm at which the valve is set, the diaphragm will be moved upward against such predetermined pressure, allowing the auxiliary valve to move toward its seat (from its wide-open position) and thus restrict the passage of high pressure therethrough and so to the piston 10. Thereupon the unbalanced pressure upon the piston 10 will cause it to move upward and the main valve 6 to move toward its seat, thus preventing any further increase of the delivery pressure.

It will be noted that the head 21 of the auxiliary valve member 20 seats upon the floor 22 of the recess 17 in the bonnet 14 at both sides of the grooves 42, 43, and yet the contact between the two parts is a single seat as opposed to what is known as a double seat, so that an effective seal is easily obtained. Furthermore, the chamber for the auxiliary-valve member in said bonnet 14 is separate from and closed with respect to the piston chamber 11 in the body 1, and therefore a change in the size of the regulator (and consequently of the piston 10) does not affect the auxiliary-valve member and the same member can be used for a plurality of sizes of regulators. This lessens the number of spare parts necessary to be kept on hand, and is of great practical advantage. Again, by having the high pressure duct 35 open into the cavity 19 and the direction of flow upward to the auxiliary valve through the aperture 38, 38 in the cap 27, said cap is conveniently provided with an exterior sleeve-like screen 47 of wire gauze or the like, by which any dirt or other foreign matter is deposited in the bottom of said cavity 19, and prevented from reaching the auxiliary-valve or interfering with its operation. Preferably said screen 47 fits at its ends onto reduced portions of the cap and the body of the member 20, as shown, and in order to afford more ready flow to the apertures 38 and greater screening surface the reduced portion of the cap is circumferentially recessed around said apertures, as at 48. It is not until after it has passed the auxiliary valve that the high pressure enters the annular grooves 42, 43 at the seating of the valve member and so passes on through the ducts 44, 44 in the bonnet 14 to the piston chamber.

A tubular screen 49 of wire gauze or the like is also provided for the main valve 6, by reducing the adjacent ends of the valve seat 5 and the cap 8 to receive and support said screen. This prevents any dirt or other foreign matter reaching the main valve 6 and causes it to be deposited at the bottom of the flow passage. By providing an outlet 50 from the bottom of the flow passage, with a closing plug 51, any accumulation of dirt there can be blown out, when desired, and a similar outlet 52 from the bottom of the cavity 19 in the bonnet 14, and plug 53 therefor, enables any accumulation of dirt from the screen 47 for the auxiliary-valve to be similarly blown out.

Various detail structural modifications may be made by those skilled in the art in carrying out my invention, without departing from the spirit or scope thereof, and therefore I do not desire to be understood as limiting myself except as required by the following claims when construed in the light of the prior art.

Having thus described the invention, what I claim is:

1. A pressure regulator having a body with a main valve, a piston therefor and a chamber for said piston, a bonnet closing said piston chamber and recessed at its top to form a diaphragm chamber, said bonnet having in the floor of said recess an opening leading to a high pressure cavity and said bonnet having a high pressure duct leading to said chamber for the piston independent of said cavity, a member seated in said opening of the bonnet with its end projecting into said cavity free from the walls thereof and providing a high pressure passage from said cavity to said high pressure duct in the bonnet, and an auxiliary-valve in said passage.

2. A pressure regulator having a body with a main valve, pressure responsive means for moving said valve and a chamber for said means, a bonnet closing said piston chamber and recessed at its top to form a diaphragm chamber, said bonnet having in the floor of said recess an opening leading to a high pressure cavity and said bonnet having a high pressure duct leading to said pressure-responsive means independent of said cavity, a member seated in said opening of the bonnet with its end projecting into said cavity free from the walls thereof and providing a high pressure passage, an auxiliary-valve in said passage, a screen in said cavity through which the high pressure must pass to said auxiliary-valve, and a blow-out leading from said cavity independent of said auxiliary-valve.

3. A pressure regulator having a body with a main valve, pressure-responsive means for moving said valve and a chamber for said means, a bonnet closing said piston chamber and recessed at its top to form a diaphragm chamber, said bonnet having in the floor of said recess an opening leading to a high pressure cavity and said bonnet having a high pressure duct leading to said pressure-responsive means independent of said cavity, a member seated in said opening of the bonnet with its end projecting into said cavity free from the walls thereof and providing a high pressure passage, an auxiliary-valve in said passage, a valve cap at the lower end of said member, and a screening sleeve on said cap through which the high pressure must pass to said auxiliary-valve.

4. A pressure regulator having a body with a main valve, pressure-responsive means for moving said valve and a chamber for said means, a bonnet closing said piston chamber and recessed at its top to form a diaphragm chamber, said bonnet having in the floor of said recess an opening leading to a high pressure cavity and said bonnet having a high pressure duct leading to said pressure-responsive means independent of said cavity, a member seated in said opening of the bonnet with its end projecting into said cavity free from the walls thereof and providing a high pressure passage, an auxiliary-valve in said passage, a valve cap at the lower end of said member, a screening sleeve on said cap through which the high pressure must pass to said auxiliary-valve, and a blow-out leading from the lower part of said cavity independent of said auxiliary-valve.

5. A pressure regulator having a body with a main valve, pressure-responsive means for moving said valve and a chamber for said means, a bonnet closing said chamber and recessed at its top to form a diaphragm chamber, said bonnet having in the floor of said recess an opening leading to a cavity below which communicates at its upper part with the high pressure and said bonnet having a high pressure duct leading to said pressure-responsive means independent of said cavity, a member seated in said opening of the bonnet with its end projecting into said cavity free from the walls thereof and providing a high pressure passage, an auxiliary-valve in said passage, a screening sleeve through which the high pressure must pass to said auxiliary-valve, the bottom of the cavity affording lodgment for dirt, and a blow-out leading from said bottom of the cavity.

6. In a pressure regulator of the character described, a bonnet having a diaphragm recess providing a floor with a central threaded opening therein, a member having a threaded portion in said opening and a head with an annular seat seating against said floor and forming therewith an annular groove with an annular portion of said seat between said groove and the threads, said member and the bonnet having high pressure passages leading to said groove, and an auxiliary-valve in the said passage of said member.

7. In a pressure regulator of the character described, the combination with a bonnet providing a threaded opening with an annular seat around the same, of a member having a threaded portion in said opening and a head with an annular seat seating upon said seat around the opening, one of said seats being grooved at a distance from its edge next said threads, ducts in said bonnet and member for conducting high pressure through said groove, and an auxiliary-valve in said member for controlling such passage of high pressure.

8. In a pressure regulator of the character described, the combination with a bonnet providing a threaded opening with an annular seat around the same in a plane at right angles thereto, of a member having a threaded portion in said opening and a head with an annular seat seating upon said seat around the opening, one of said seats being grooved at a distance from its edge next said threads, ducts in said bonnet and member for conducting high pressure through said groove, and an auxiliary-valve in said member for controlling such passage of high pressure.

9. In a pressure regulator of the character described, a bonnet having a diaphragm recess providing a plane floor with a central opening therein, a member having a threaded portion in said opening and a head with a plane annular seat parallel to said floor, said head and floor having in their said parallel surfaces registering grooves spaced from the said threaded portion of the member, and said member and the bonnet having high pressure passages leading to said registering grooves, and an auxiliary-valve in the passage of said member.

10. In a pressure regulator, the combination with an upwardly closing valve in a chamber to which the pressure is supplied at one side, a spring for said valve and a cap for said spring permitting flow laterally thereof, of a screening sleeve for said valve telescopically engaged and held in place by said cap, and a blow-out leading from the bottom of said chamber at the opposite side thereof from that where the pressure enters.

11. In a pressure regulator, the combination with a body portion having a chamber open at the top of the body portion, a main valve and pressure-responsive means in said chamber for moving said valve, a bonnet closing said chamber and recessed at its top to form a diaphragm chamber and having in the floor of said recess an opening leading to a high pressure cavity, a high pressure duct leading from said recess in the bonnet to said chamber in the main body portion independent of said cavity, a member seated in said opening in the bonnet with its end free in said cavity and providing a high pressure passage from said cavity to said high pressure duct, and an auxiliary valve in said passage.

12. In a pressure regulator, the combination with a main body portion, a main valve and pressure-responsive means for moving said valve, an auxiliary body portion recessed at its top to form a diaphragm chamber and having in the floor of said recess an opening leading to a high pressure cavity, a high pressure duct leading from said recess in the auxiliary body portion to said pressure-responsive means in the main body portion independent of said cavity, a member seated in said opening in the auxiliary body portion with its end free in said cavity and providing a high pressure passage from said cavity to said high pressure duct, an auxiliary valve in said passage, and means for connecting said cavity and said recess to the high pressure and low pressure sides of the main valve respectively.

WILLIAM F. KRICHBAUM.